(12) United States Patent
Eisele et al.

(10) Patent No.: US 7,191,045 B2
(45) Date of Patent: Mar. 13, 2007

(54) METHOD FOR DETERMINING A TRIGGER TIME FOR RESTRAINT MEANS IN A VEHICLE

(75) Inventors: Sybille Eisele, Murr (DE); Michael Roelleke, Leonberg-Hoefingen (DE); Marc Theisen, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/042,448

(22) Filed: Jan. 25, 2005

(65) Prior Publication Data

US 2005/0192731 A1 Sep. 1, 2005

Related U.S. Application Data

(63) Continuation of application No. 10/488,376, filed as application No. PCT/DE02/02629 on Jul. 18, 2002, now abandoned.

(30) Foreign Application Priority Data

Aug. 28, 2001 (DE) ................................ 101 41 886

(51) Int. Cl.
*B60R 22/00* (2006.01)

(52) U.S. Cl. ............................ 701/45; 701/46; 701/47; 180/271; 180/282; 340/438; 340/440; 280/734; 280/735

(58) Field of Classification Search ............ 701/45–47, 701/36; 180/271, 282; 280/728.1, 734–735; 307/9.1, 10.1; 340/438, 903, 425.5
See application file for complete search history.

(56) References Cited

U.S. PATENT DOCUMENTS

| | | | | |
|---|---|---|---|---|
| 5,809,439 | A * | 9/1998 | Damisch | ...................... 701/45 |
| 6,047,985 | A | 4/2000 | Yoshida | |
| 6,181,998 | B1 | 1/2001 | Kanameda et al. | |
| 6,199,903 | B1 * | 3/2001 | Brambilla et al. | .......... 280/735 |
| 6,725,141 | B2 * | 4/2004 | Roelleke | ...................... 701/45 |

FOREIGN PATENT DOCUMENTS

| | | |
|---|---|---|
| DE | 197 40 019 | 3/1999 |
| DE | 198 40 440 | 3/2000 |

\* cited by examiner

*Primary Examiner*—Y. Beaulieu
(74) *Attorney, Agent, or Firm*—Kenyon & Kenyon LLP

(57) ABSTRACT

A method for determining the trigger time for restraint means in a vehicle is provided, where, by forming two time windows for the speed reduction in a crash, the slope of the speed reduction in the respective time windows and the position of the time windows are determined. In this manner, an exact determination of the trigger time in conjunction with a crash time and the crash speed may be achieved, which are ascertained with the aid of a pre-crash sensory system.

6 Claims, 2 Drawing Sheets

METHOD FOR DETERMINING A TRIGGER TIME FOR RESTRAINT MEANS IN A VEHICLE

CROSS-REFERENCE TO RELATED APPLICATION

This application is a continuation of prior application Ser. No. 10/488,376 filed Mar. 1, 2004 now abandoned, which is the national phase of PCT/DE02/02629.

FIELD OF THE INVENTION

The present invention relates to a method and a device for determining a trigger time for restraint means in a vehicle.

SUMMARY

The method according to the present invention for determining a trigger time for restraint means in the vehicle provides the following advantages: The trigger time may be determined more precisely by considering the speed reduction in at least one time window, the crash time, and the crash speed. This method allows crashes against a rigid barrier to be effectively distinguished from other types of crashes, and, therefore, the differences in severity between the crash types are more effectively established.

The method according to the present invention provides advantageous improvements for determining a trigger time for restraint means in a vehicle.

It is advantageous that a second time window is determined after the first time window, and that the slope of the speed reduction and the position of the time window in the corresponding speed range are determined for each of the two time windows. In this manner, a crash type may be determined in connection with the crash speed and the crash time, the crash type then leading to the determination of the trigger time. This allows, on the whole, a more precise determination of the trigger time.

In addition, it is advantageous that the crash time and the crash speed are determined with the aid of a pre-crash sensory system, e.g., radar sensors, video sensors, and/or ultrasonic sensors, which may all be mounted at different positions in a vehicle to obtain a panoramic view.

It is also advantageous that a minimum time is specified for each time window, in order to prevent a reaction to interference. If this minimum time is not reached, then the time window is assumed to be nonexistent.

Furthermore, it is advantageous that the reached threshold value for the speed reduction after detection of the crash type is assumed to be a continuous threshold-value function. This provides the advantage of compensating for a fluctuation during the determination of the trigger time. Therefore, this results in a more precise determination of the trigger time. In addition, any inaccuracy in the crash time does not directly enter into the calculation of the trigger time while using the signal characteristic.

Finally, is also advantageous that, for a particular crash type and a particular crash speed, a corresponding trigger time is determined with the aid of a table. This accelerates the execution of the method according to the present invention.

DETAILED DESCRIPTION

Figure 1:
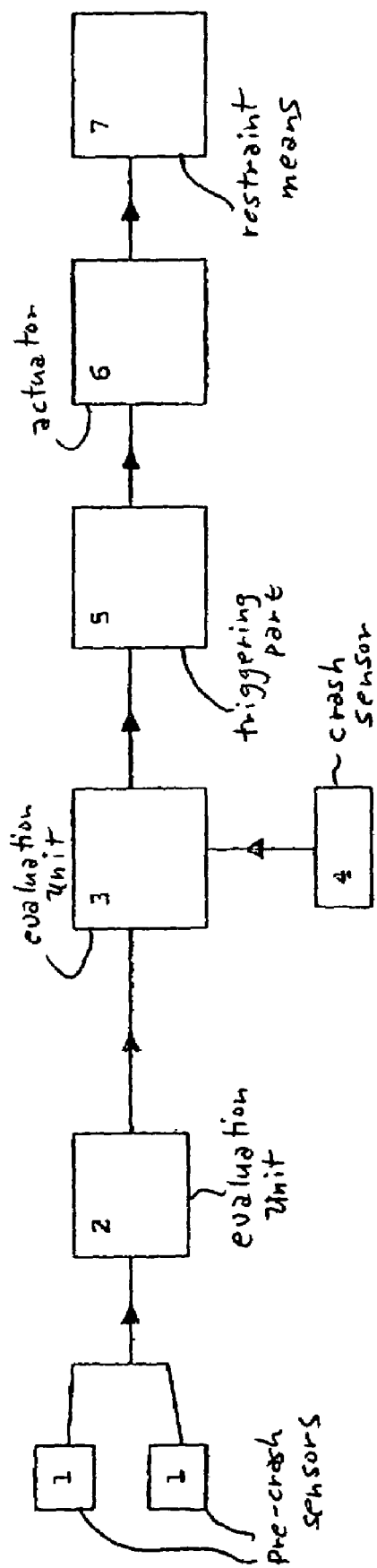
FIG. 1 shows a block diagram of an exemplary embodiment of a device according to the present invention for determining a trigger time for a restraint unit.

In addition to pure crash sensors, such as acceleration sensors, pre-crash sensors, which provide crash-speed and crash-time information before the beginning of a crash, are used in the future for crash detection in a motor vehicle. Thus, a system discussed herein utilizes both the signals of a crash sensor and those of a pre-crash sensor.

A crash intensity is a function of the crash configuration, e.g., a front-end crash, a side crash, or crash that takes place at a particular angle; a function of the characteristics of the obstacle, e.g., the stiffness, the mass, the shape, and the size; and a function of the crash speed of the motor vehicle. As used herein, "crash type" refers to a combination of the crash configuration and the characteristics of the obstacle or the barrier. According to the present invention, the crash type shall be identified by speed-dependent characteristics. This allows the optimum trigger time, i.e., the time when the restraint means, e.g., airbag or belt tensioner, are triggered. Therefore, these characteristics must be detected prior to or, at the latest, at the same time as the triggering decision. According to the present invention, a continuous threshold-value function for the speed reduction is used for calculating the trigger time, so that a fluctuation during the calculation of the trigger time may be compensated for. Then, in this context, only a signal characteristic, and not any inaccuracy in the crash time, affects the determination of the trigger time.

A crash, e.g., a front-end crash, proceeds in several phases. Initially, a first barrier is deformed, whereby a sharp, negative gradient of the speed reduction occurs. A second negative gradient is generated in the further course of the crash, the interval of the two gradients being a function of the crash speed.

A sharp speed reduction correlates with failure behavior in the corresponding vehicle structures. The first gradient represents fracture behavior in the region of the bumper, and the second gradient represents fracture behavior in the structures behind the bumper, for example, in a crash box. A crash box is understood to be a structure, e.g., a type of buffer or rupture joint behind the bumper, which ensures that, in the event of crashes having a low crash speed (up to approximately 15 km/h), only the bumper and the crash box must be replaced when the vehicle is repaired, assuming that the vehicle is only hit at the bumper. Speed is scarcely reduced between the two gradients. After the first failure behavior, acceleration may even occur in parts of the interior, that is, the region in which the acceleration sensor is located. The curve of the speed reduction between the two gradients displays an elastic behavior. The magnitude of the negative slope in the first gradient tends to increase with the crash speed.

The present invention provides a method which detects the two time windows of the speed-reduction gradients and their slopes. To this end, the signal pattern of the speed reduction between the two successive sampling values is assumed to be linear. The slopes of the line segments between successive sampling values are continually compared to the respective previous ones. As soon as the instantaneous slope deviates from the previous slope by less than an applicable parameter and the detected slope is more negative then an applicable threshold value, the start of a time window is detected. If this condition no longer applies, then the end of the time window is detected.

A detected time window must also have a minimum length, which is specifiable as well; otherwise, it is not recognized as a meaningful time window. During the calculation of the slope of a gradient in a time window, a straight line is drawn through the starting point and end point of the detected time window, and the slope of the straight line is determined. However, it is also possible to use other methods that utilize more sampling points for determining the slope.

The parameters for comparing the slopes of the line segments may be used independently of each other for the two time windows. The method of the present invention detects the beginning and the end of a time window using, in each instance, a delay from a sampling value.

Taking the required trigger time into consideration, the crash tests of the considered crash type, a front-end crash against a rigid barrier, are divided into two groups: The first group includes crashes having a low to medium crash speed, while the second group includes crashes which have a high crash speed. In crashes of the second group, the time between the start of crash and the triggering decision is quite short. In these crashes, the end of the first time window is used for calculating the trigger time. In the first group, the two gradients are detected prior to the required trigger time. Using the additional information regarding the crash speed, the correct trigger time may be inferred, for example, by accessing a table, in which the trigger times dependent on the crash speed are laid out. In the case of utilizing a table, inaccurate information regarding the crash time may cause problems, since the accuracy of the crash time is directly carried over to the accuracy of the trigger time.

In the first group of crashes, a continuous threshold-value function for the attained speed reduction is used to calculate the trigger times. If the two time windows were detected and identified by evaluating the position of the windows and the slopes of the two gradients of the crash type, then the curve of the speed reduction continues to be monitored, until it exceeds the continuous threshold-value function, which point in time indicates the trigger time.

FIG. 1 shows the device of the present invention in the form of a block diagram. Pre-crash sensors 1, e.g., radar sensors and/or ultrasonic sensors, are connected to an evaluation unit 2 for ascertaining the crash speed and the crash time. Therefore, evaluation unit 2 is a processor.

In this case, pre-crash sensors 1 are radar sensors. However, video sensors or ultrasonic sensors may also be used in addition, or as an alternative. Evaluation unit 2 is then connected to a further evaluation unit 3, namely, at its first data input, which is used to identify the type of crash within predefined speed ranges and to calculate the triggering. To this end, evaluation unit 3, which also takes the form of processor, uses additional data from a crash sensor 4, which is connected to a second data input of evaluation unit 3. In this case, crash sensor 4 is an acceleration sensor having additional electronics, which are used for signal processing. For the sake of simplicity, only one acceleration sensor 4 is indicated here, but more acceleration sensors may be connected, e.g., remote sensors, which may be present on the radiator in the form of up-front sensors, or in the side and/or on the lower seat cross member in the form of the side-crash sensors. In addition, it is also possible for acceleration sensors to be situated in a central control unit and also, for example, at a highway tunnel. Pressure sensors and/or structure-borne noise sensors and/or temperature sensors may be used in place of acceleration sensors. Evaluation units 2 and 3 may be combined into one processor.

Evaluation unit 3 calculates the trigger time from the data input from evaluation unit 2 and crash sensor 4, using the method of the present invention, and transmits the trigger time to a triggering part 5 for the actuator system. In this case, triggering part 5 is an ignition-circuit control unit, which controls an actuator 6 that triggers restraint means 7 at the trigger time.

Figure 2:
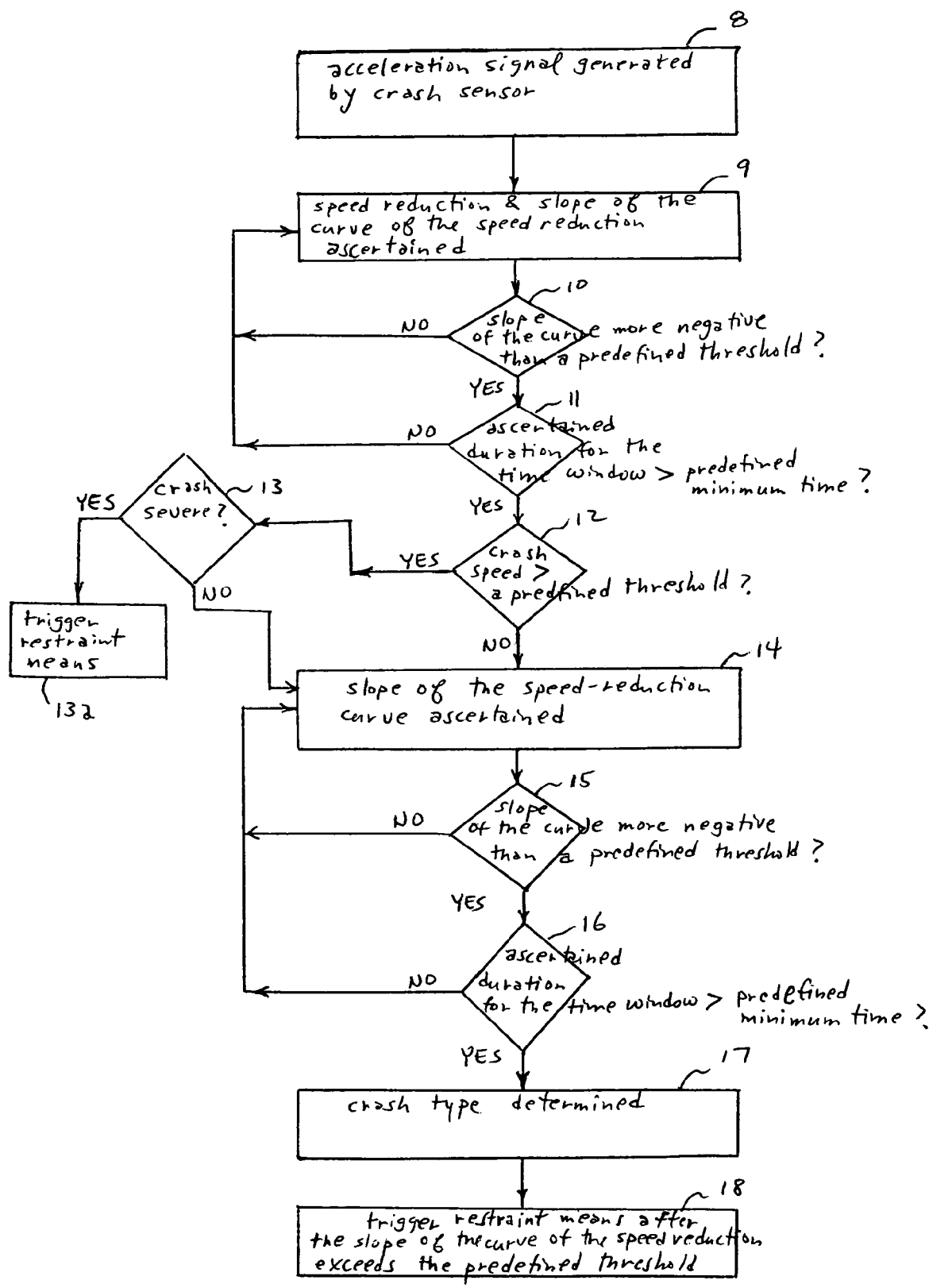
FIG. 2 shows a flowchart of an exemplary method according to the present invention for determining a trigger time for a restraint unit.

FIG. 2 shows in a flowchart the method of the present invention. In method step 8, the acceleration signal is generated by crash sensor 4. In the event of impingement upon the vehicle, corresponding accelerations are generated, from which crash sensor 4 generates the acceleration signal.

In method step 9, the speed reduction and the slope of the curve of the speed reduction are ascertained in the event of a crash. The speed reduction is derived from the acceleration signal. This is accomplished by performing an integration for the acceleration signal. The slope of the curve of the speed reduction is derived from the speed reduction. This is accomplished by linearly interpolating between sampling values of the speed reduction. As an alternative, it is also possible to carry out other types of interpolation here, i.e., nonlinear.

In method step 10, it is then checked if the ascertained slope is more negative than a predefined threshold value for the slope. A first time window is only started when this is the case. In addition, the time period for which the currently ascertained slope of the speed-reduction curve falls below the predefined threshold value for the slope, is determined in this method step. If this condition no longer applies, then a jump is made to method step 11, in which it is checked whether the ascertained duration for the time window has exceeded a specified, minimum time. However, if it is detected in method step 10 that the slope is not more negative than the predefined threshold value, then the method returns to method step 9, and the slope of the speed-reduction curve continues to be ascertained.

If it is determined in method step 11 that the period of time ascertained in method step 10 has not reached the minimum time, then the method returns to method step 9. However, if this minimum time is exceeded, then the first time window receives the time ascertained in method step 10, and it is checked in method step 12 whether the crash speed, which was ascertained by pre-crash sensors 1 and evaluation unit 2, has exceeded a predefined threshold. If this is the case, then a crash type is identified by evaluation unit 3 in method step 13, in that the slope in the first time window is determined, and the position of the first time window in the corresponding speed range is determined. If the crash is severe, i.e., a crash against a rigid barrier, then the end of the first time window is therefore recognized as being the trigger time. Then, restraint means 7 are triggered by triggering part 5 and actuator 6 in step 13a. If the crash is soft, then a jump is made to method step 14.

However, if it was determined in step 12 that the crash speed is not above this threshold value, then the slope of the speed-reduction curve is ascertained again in step 14, in order to check in method step 15, whether a predefined threshold value for a second time window was undershot by the slope. If this is not the case, then the slope of the speed-reduction curve continues to be ascertained in method step 14. In method step 15, the period of time for which the previously mentioned condition applies, i.e., the slope of the speed-reduction curve falls below the predefined threshold value, is also ascertained. In method step 16, it is checked whether the ascertained period of time has exceeded the specified minimum time.

If the ascertained period of time does not reach the minimum time, then the slope of the speed-reduction curve continues to be ascertained. If the ascertained period of time has exceeded the minimum time, the second time window receives the ascertained period of time, and a crash-type identification is carried out by evaluation unit 3 in method step 17. This is carried out using the position of the two time windows, and a plausibility check is carried out using the slope in the time windows for the corresponding speed range.

In method step 18, the curve of the speed reduction is then further monitored until a predefined threshold-value function for the speed reduction is exceeded. Then, the trigger time is detected, and restraint means 7 is triggered. The threshold-value function is selected as a function of the identified crash type.

What is claimed is:

1. A method for determining a trigger time for restraint means in a vehicle, comprising:
   generating acceleration signals using acceleration sensors, wherein a velocity reduction of the vehicle that occurs in a case the vehicle crashes into an object, is determined from the acceleration signals;
   determining at least one first time window as a function of at least one comparison of the velocity reduction to at least one first threshold value; and
   determining the trigger time as a function of at least the slope of the velocity reduction in the at least one first time window, a crash time, and a crash speed, wherein the crash time and the crash speed are determined with the aid of a precrash sensor system.

2. The method as recited in claim 1, wherein a second time window is determined as a function of the crash speed, the position of the first time window, and the slope of the velocity reduction in the first time window, and wherein a crash type is determined as a function of specific positions of the first and second time windows, the crash time, and the crash speed, and wherein the velocity reduction is compared to a second threshold value after the end of the second time window, in order to determine the trigger time as a function of the crash type.

3. The method as recited in claim 1, wherein a minimum time is stipulated for the at least one first time window.

4. The method as recited in claim 2, wherein the second threshold value is a continuous threshold value function.

5. The method as recited in claim 1, wherein, for each crash type, a trigger time corresponding to a particular crash time is determined with the aid of a table.

6. The method as recited in claim 2, wherein, for each crash type, a trigger time corresponding to a particular crash time is determined with the aid of a table.

* * * * *